(12) United States Patent
Meier et al.

(10) Patent No.: US 7,493,084 B2
(45) Date of Patent: Feb. 17, 2009

(54) METHOD FOR GROUPING 802.11 STATIONS INTO AUTHORIZED SERVICE SETS TO DIFFERENTIATE NETWORK ACCESS AND SERVICES

(75) Inventors: Robert C. Meier, Cuyahoga Falls, OH (US); Tim Olson, San Jose, CA (US); Victor J. Griswold, North Canton, OH (US); Sheausong Yang, Saratoga, CA (US); Bhavannarayana Nelakanti, Sunnyvale, CA (US)

(73) Assignee: Cisco Technology, Inc.

( * ) Notice: Subject to any disclaimer, the term of this patent is extended or adjusted under 35 U.S.C. 154(b) by 634 days.

(21) Appl. No.: 11/106,943

(22) Filed: Apr. 15, 2005

(65) Prior Publication Data

US 2005/0185626 A1    Aug. 25, 2005

Related U.S. Application Data

(63) Continuation of application No. 10/212,193, filed on Aug. 2, 2002, now Pat. No. 6,950,628.

(51) Int. Cl.
*H04B 7/00* (2006.01)

(52) U.S. Cl. .......... 455/41.2; 455/461; 455/414.1; 455/417; 455/418; 455/456.4; 340/7.1; 340/870.02; 342/357.1; 342/357.06; 342/357.13; 370/338; 370/348; 370/468

(58) Field of Classification Search .......... 455/41.2, 455/414.1, 461, 417, 456.4, 512, 41.1, 418; 340/7.1, 870.02; 342/357.1; 370/312, 392

See application file for complete search history.

(56) References Cited

U.S. PATENT DOCUMENTS

| 5,544,308 | A | * | 8/1996 | Giordano et al. ............. 714/26 |
| 6,097,960 | A |   | 8/2000 | Rathnasabapathy et al. |
| 6,181,927 | B1 |  | 1/2001 | Welling, Jr. et al. |
| 6,181,935 | B1 |  | 1/2001 | Gossman et al. |
| 6,266,013 | B1 |  | 7/2001 | Stilp et al. |
| 6,301,474 | B1 |  | 10/2001 | Hartmaier et al. |
| 6,332,077 | B1 |  | 12/2001 | Wu et al. |

(Continued)

OTHER PUBLICATIONS

Microsoft, Recommendations for IEEE 802.11 Access Points, Web Article listed on microsoft.com; Apr. 2, 2002.

(Continued)

*Primary Examiner*—Marceau Milord
(74) *Attorney, Agent, or Firm*—Tucker Ellis & West LLP

(57) ABSTRACT

A method for associating a WSTA to a service set, wherein the service set is configurable at the AP. Each service set is an arbitrary grouping of one or more network service parameters, and is typically configured for either VLAN or proxy mobile IP host. When a wireless station desires to associate with an access point, the wireless station sends a message to the access point, the message containing a SSID. The access point then matches the SSID to a service set and associates the WSTA to either a home subnet or a VLAN based on the SSID. By locally configuring the service set, the default VLAN and home subnet for a WSTA may be different at each AP the WSTA encounters. A security server is configured with a list of allowed SSIDs for each wireless station to prevent unauthorized access to a VLAN or home subnet.

15 Claims, 5 Drawing Sheets

U.S. PATENT DOCUMENTS

| | | | |
|---|---|---|---|
| 6,466,964 B1 * | 10/2002 | Leung et al. | 709/202 |
| 6,512,754 B2 | 1/2003 | Feder et al. | |
| 6,577,643 B1 | 6/2003 | Rai et al. | |
| 6,587,433 B1 | 7/2003 | Borella et al. | |
| 6,608,832 B2 | 8/2003 | Forslow | |
| 6,636,502 B1 | 10/2003 | Lager et al. | |
| 6,950,628 B1 * | 9/2005 | Meier et al. | 455/41.2 |
| 7,058,071 B1 * | 6/2006 | Myles et al. | 370/419 |
| 7,181,530 B1 * | 2/2007 | Halasz et al. | 709/238 |
| 7,251,232 B1 * | 7/2007 | Meier | 370/338 |
| 7,260,638 B2 * | 8/2007 | Crosbie | 709/229 |
| 7,321,784 B2 * | 1/2008 | Serceki et al. | 455/557 |
| 2001/0024436 A1 * | 9/2001 | Barraclough et al. | 370/352 |

OTHER PUBLICATIONS

International Search Report mailed Jan. 23, 2004, related to PCT Patent Application No. PCT/US03/22982.

* cited by examiner

METHOD FOR GROUPING 802.11 STATIONS INTO AUTHORIZED SERVICE SETS TO DIFFERENTIATE NETWORK ACCESS AND SERVICES

CROSS-REFERENCE TO RELATED APPLICATIONS

This application is a continuation of U.S. application Ser. No. 10/212,193 filed on Aug. 2, 2002 now U.S. Pat. No. 6,950,628.

BACKGROUND OF THE INVENTION

The present invention relates generally to network access and more particularly to a method and system to differentiate network access for different classes of users.

It is becoming increasingly important to differentiate network access for different classes of users, in particular different classes of wireless LAN users. One proposal for providing differentiated network access and services is that Access Points should implement a method wherein a Remote Authentication Dial-In User Server (RADIUS server) explicitly assigns an 802.11 station to a Virtual LAN identifier (VLAN ID) by returning a VLAN ID attribute in the RADIUS record for the station. Such RADIUS based VLAN assignment has limited scope and severely restricts mobility. A large or campus network may contain multiple VLANs that provide equivalent services. For example, a campus network may contain multiple Voice VLANS. If a RADIUS server explicitly assigns an 802.11 Voice over IP (VoIP) phone to a voice VLAN, then the phone is limited to a single voice VLAN, for example the phone may be limited to a VLAN on a single floor in a single building. The only method for segregating users is "VLAN trunking"; therefore, the proposal is generally limited to network areas with a VLAN infrastructure. Thus there exists a need for a method and system wherein multiple parameters can be grouped into a Service Set, which is controlled by a single RADIUS attribute that is not limited to a VLAN ID assignment.

For the purposes of describing the present invention, an "authorized WSTA" is any station that is explicitly authorized to access the network via a security server, and a "guest WSTA" is not explicitly authorized to access the network. A RADIUS server is used as an example security server in describing the present invention, but as those skilled in the art can readily appreciate the concepts of the present invention apply with any security server.

It should be noted that a "Service Set" as defined herein is not the same as an 802.11 Extended Service Set (ESS).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

In view of the aforementioned needs, an aspect of the present invention contemplates a method for an access point to associate a wireless station to either a home subnet or a VLAN based on a configuration stored locally at the access point. When a wireless station desires to associate with an access point, the wireless station sends a message to the access point, the message containing a service set identifier (SSID), which is an arbitrary "name" for a service set. The access point then associates the wireless station to either a home subnet or a VLAN based on the SSID.

In accordance with an aspect of the present invention, there is disclosed herein an access point, comprising a wireless transceiver. The access point is responsive to an association request, the association request comprising an identifier for the wireless station making the request and a service set identifier indicative of a service set that identifies a type of service for the wireless station, received by the wireless transceiver to determine whether the access point is configured to support the service set. The access point is responsive to accept the association request upon a determination that the access point is configured to support the service set. The access point is responsive to deny the association request upon a determination that the access point is not configured to support the service set.

In accordance with an aspect of the present invention, there is disclosed herein a method for an access point to determine whether to allow a wireless station to associate. The access point receiving an association request, the association request comprising an identifier for the wireless station making the request and a service set identifier indicative of a service set that identifies a type of service for the wireless station. The access point determining whether the access point is configured to support the service set. The access point denying the association request upon a determination that the access point is not configured to support the service set.

In accordance with an aspect of the present invention, there is described herein an access point, comprising means for receiving from a wireless station an association request, the association request comprising an identifier for the wireless station making the request and a service set identifier indicative of a service set that identifies a type of service for the wireless station. The access point further comprises means for determining whether the access point is configured to support the service set. The access point comprises means for accepting the association request responsive to the means for determining whether the access point is configured to support the service set determining that the access point is configured to support the service set. The access point also comprises means for denying the association request responsive to the means for determining whether the access point is configured to support the service set determining that the access point is not configured to support the service set.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE SEVERAL VIEWS OF THE DRAWING

The drawings illustrate the best mode presently contemplated of carrying out the invention.

DETAILED DESCRIPTION OF INVENTION

Figure 1:
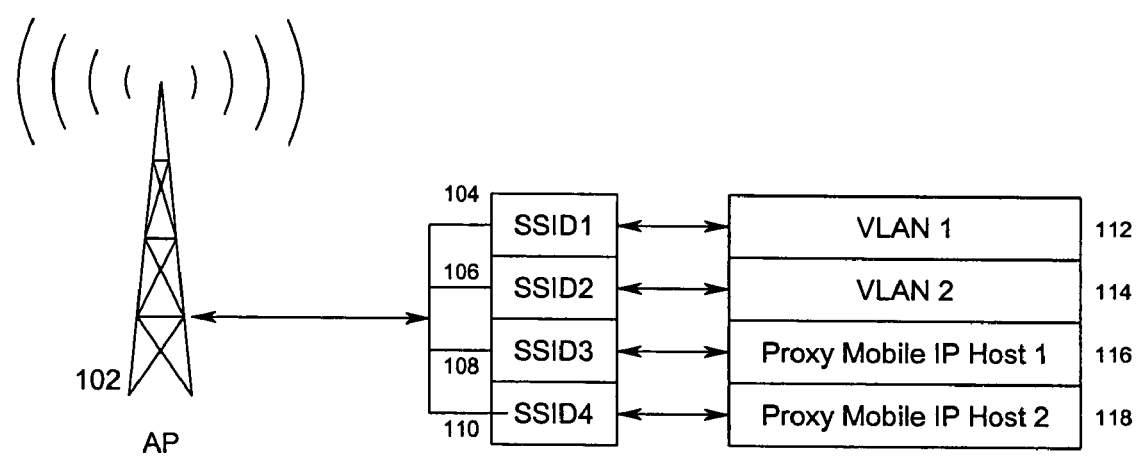
FIG. 1 is a block diagram illustrating the relationship between an AP, SSID and VLAN or Proxy Mobile IP Host as contemplated by the present invention.

The present invention contemplates a method where wireless stations (WSTAs) are partitioned into "Service Sets." A Service Set Identifier (SSID) identifies each service set. The SSID can be a standard 802.11 SSID.

A Service Set is an arbitrary grouping of one or more network service parameters. Service parameters may be used to differentiate network access for security purposes. For example, "guest" WSTAs that are restricted to secure "guest" subnets may be grouped into a "GUEST" Service Set. Service parameters may also be used to differentiate network services that are not necessarily related to security. For example, employee WSTAs that require a "Proxy Mobile IP" service for seamless campus mobility may be grouped into a "MOBILE-EMPLOYEE" Service Set.

Service Set authorization is accomplished in one of two ways. While the following examples use a RADIUS server, as those skilled in the art can readily appreciate, the authorization may be accomplished with any security server. First a RADIUS server can explicitly authorize a WSTA to join one or more Service Sets. In the first case, the RADIUS server returns a list of allowed SSID's in the RADIUS record for the WSTA. For backward compatibility with legacy 802.11 systems the absence of the SSID list can be interpreted as a list of all SSIDs. Second, a RADIUS server can explicitly assign a WSTA to a Service Set. In that case, the RADIUS server returns an "assigned SSID" in the RADIUS record for the WSTA. Note that the first method enables the WSTA to change its active Service Set without requiring configuration changes to the RADIUS database.

A standard 802.11 WSTA sends an association message, which contains an 802.11 SSID, each time it associates with a parent AP. A WSTA is only associated if it successfully passes any authentication criteria that is defined for its SSID, and the WSTA is authorized to join the Service Set identified by its SSID or is explicitly assigned to a different SSID by the RADIUS server.

Unauthenticated "guest WSTAs" are assigned to a default guest Service Set, which may permit restricted access to the network.

Service set parameter values that determine a WSTA's home subnet are configured locally in wireless access points (APs) so that parameter values have local significance. For example, a campus network may have a voice VLAN in each building. A "VOICE" SSID can be bound to VLAN 10 in building 1 and VLAN 20 in building 2. A WSTA configured with the "VOICE" SSID can access any voice VLAN.

AP's determine current Service Set parameter values from SSID configuration values and WSTA 'context' information. For example, a WSTA may belong to a Service Set named "MOBILE" that has "seamless inter-subnet mobility" enabled. A "home subnet" may be configured for the "MOBILE" SSID in each AP. Initially, a "MOBILE" WSTA is bound to the home subnet configured for "MOBILE" in its parent AP. Thereafter, as the WSTA roams, it is seamlessly bound to its original home subnet, regardless of the "home subnet" configured for "MOBILE" in any new parent AP. A context transfer protocol is used to transfer the WSTA's home subnet context to a new parent AP.

The home subnet bindings for a "MOBILE" WSTA can be aged and discarded after the WSTA becomes inactive for some period of time so that the WSTA can be bound to a different, more optimal, home subnet when it becomes active again.

A WSTA's home subnet can be automatically derived by "snooping" the source IP address in IP packets transmitted by the WSTA rather than using an access point service set parameter value to bind the WSTA to a home subnet. In that case, an SSID/home-subnet database is used to determine if the WSTA is authorized to access the home subnet that corresponds to its IP address. The SSID/home-subnet database contains a list of "allowed" subnets for each SSD. The database can be statically configured. Alternatively, APs can automatically determine the subnet address for each subnet that is accessible via one of its configured SSIDS. Note that the subnet address for an SSID may not be the same in different APs. The list of allowed subnets for each SSID is the aggregate of the local SSID/subnet bindings in all APs. (This method is necessary to support WSTA's with a permanet IP address. It is also necessary to re-establish home subnet bindings that have been aged and discarded.)

By using the Service Set method as described herein, a WSTA can be assigned to a specific VLAN ID. However this method is not limited to VLAN ID assignment. Instead, multiple parameters can be grouped into a single Service Set, which may be controlled by a single RADIUS or other security server attribute. Because the Serve Set parameters are instantiated locally in parent AP's, the Service Set parameters can be set to values that are optimal for the local network topology and current WSTA context. For example, either VLAN trunking or Mobile IP tunneling can be used, as is locally appropriate, to restrict guest WSTAs to a secure guest subnet.

Another feature that may be incorporated with the present invention is that a WSTA can change its Service Set without requiring changes to its RADIUS configuration. For example, a WSTA can inhibit seamless mobility, for example when it is running a non-IP application that prohibits inter-subnet mobility, by changing its active SSID to one that does not have Proxy Mobile IP enabled.

The method of the present invention may be implemented by using the standard 802.11 SSID, therefore, no changes are required to existing to WSTAs to obtain the benefits of the present invention.

Referring now to FIG. 1, there is shown an AP 102. The AP 102 as shown has for SSID numbers, 104, 106, 108, 110. Each SSID number 104, 106, 108, 110 has a corresponding parameter 112, 114, 116, 118 assigned to it. For example, the AP 102 will associate VLAN1 112 with SSID1 104 VLAN2 114 with SSID2 106, Proxy Mobile IP Home Agent 1 116 with SSID3 108, and Proxy Mobile IP Home Agent 2 118 with SSID4 110.

Figure 2:
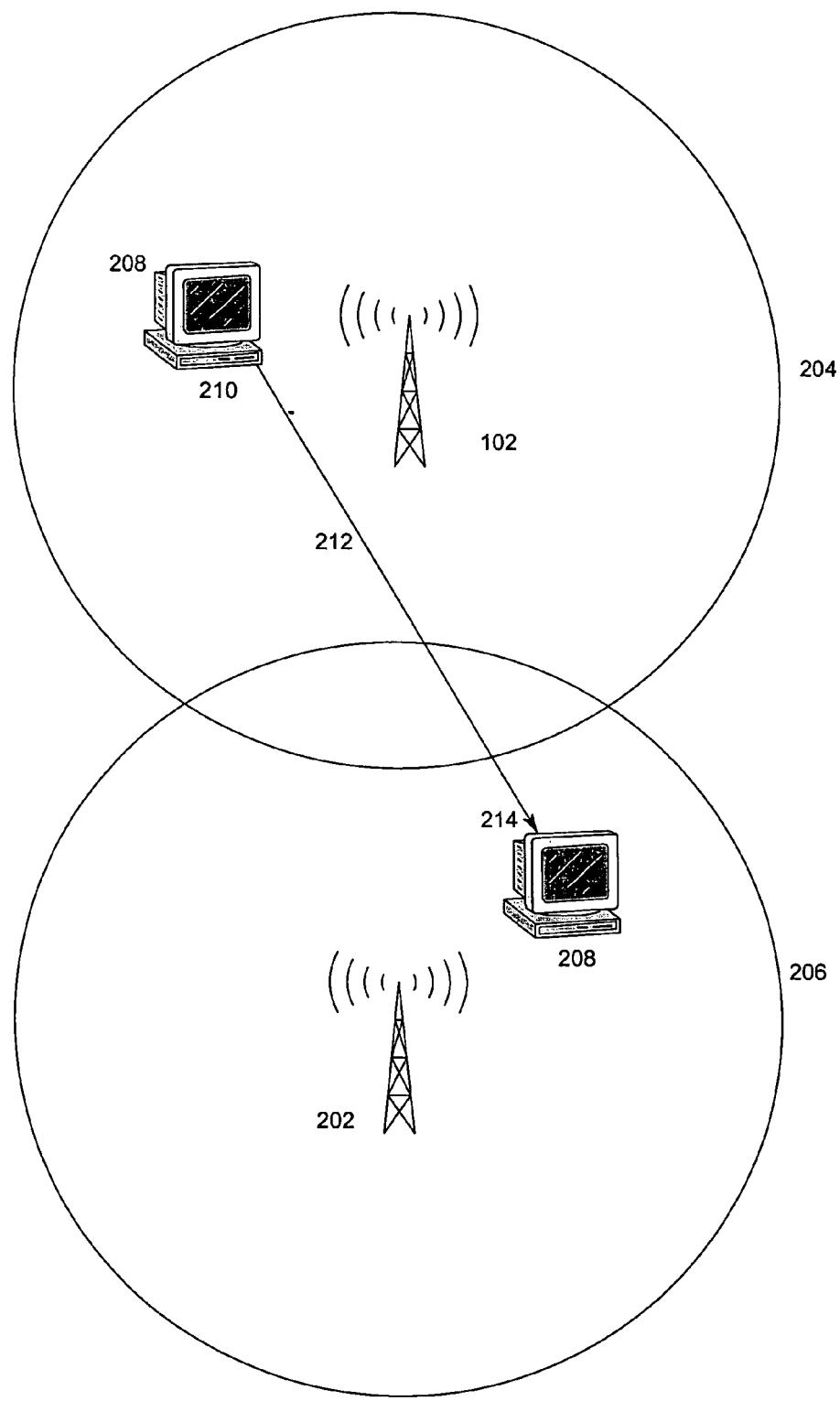
FIG. 2 is a block diagram illustrating a wireless station moving from one basic service set controlled by a first access point set to a second basic service set controlled by a second access point.

FIG. 2 shows an Extended Service Set (ESS) 200. The ESS comprises two basic service sets (BSS) 204 and 206. AP 102 controls BSS 204 and AP 202 controls BSS 206. A WSTA 208 is shown that travels a path 212 from BSS 204 to BSS 206. As contemplated by an aspect of the present invention, when WSTA 208 associates with each AP 102 and 202, it sends an SSID (not shown) to the AP 102 or 202. Because each AP is individually configured, when WSTA is associated with AP 202 it may be bound to a different VLAN or Proxy Mobile IP Home Agent than it was when it was associated with AP 102.

Figure 3:
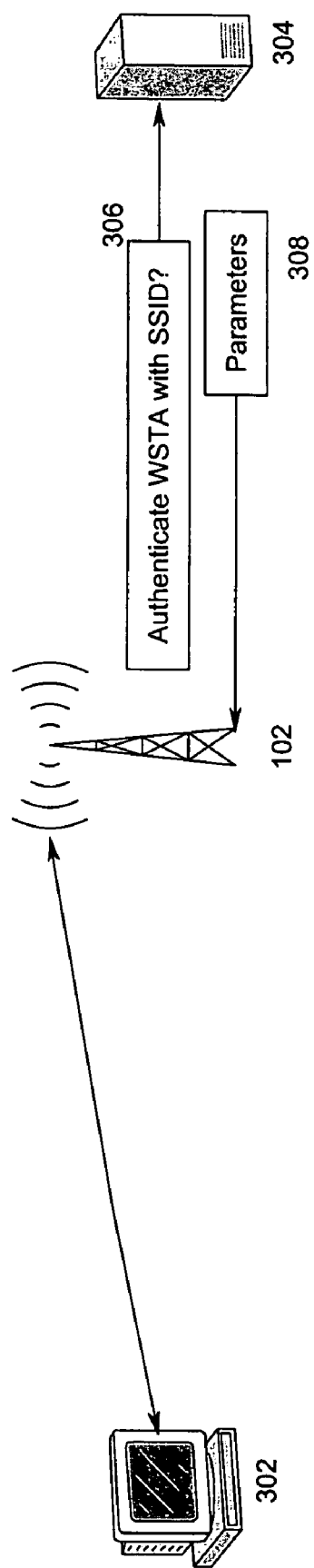
FIG. 3 is a block diagram illustrating the communications between a wireless station, access point, and a security server when a wireless station attempts to gain entry to a network.

Referring now to FIG. 3 there is shown a WSTA 302 attempting to gain access to AP 102. A message is sent from WSTA 302 to the AP 102. The AP 102 then attempts to authenticate the WSTA 302 by sending authentication message 306 comprising the WSTA 302 and the WSTA's SSID to security server 304. If the security server 304 authenticates WSTA 302, it then sends a message 308 containing parameters for the WSTA 302 to the AP 102.

Figure 4:
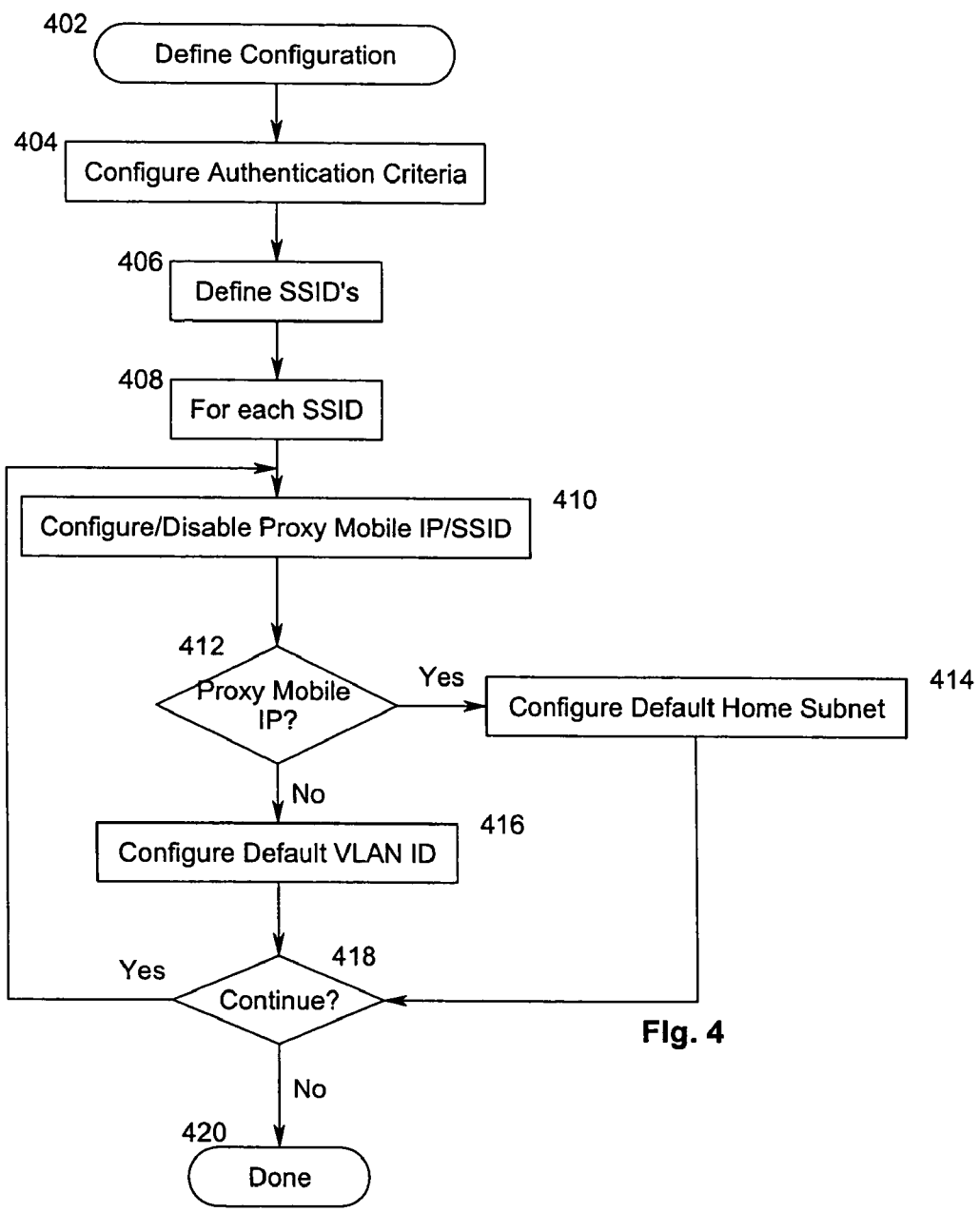
FIG. 4 is a block diagram illustrating the steps for configuring an access point for use with the present invention.

FIG. 4 shows an exemplar of a method that can be used for configuring an AP for use with the present invention. The process begins by defining a configuration at step 402. At step 404 the authentication criteria is defined. At step 406 the Service Sets and Identifiers are defined. Then as shown at step 408, for each ID which may be done either at the same time the for Service Set are defined or separately, the parameters for each SSID are defined. As shown in step 410 Proxy Mobile IP is either configured or disabled for each SSID. As shown in step 412, if Proxy Mobile IP is enabled, then the default home subnet is configured as shown at step 414. If Proxy Mobile IP is disabled, then the default VLAN ID is configured as shown at 416. If there are more Service Sets to configure, then as shown in step 418 processing returns to step 410, otherwise, as shown in step 420 the process is completed.

Figure 5:
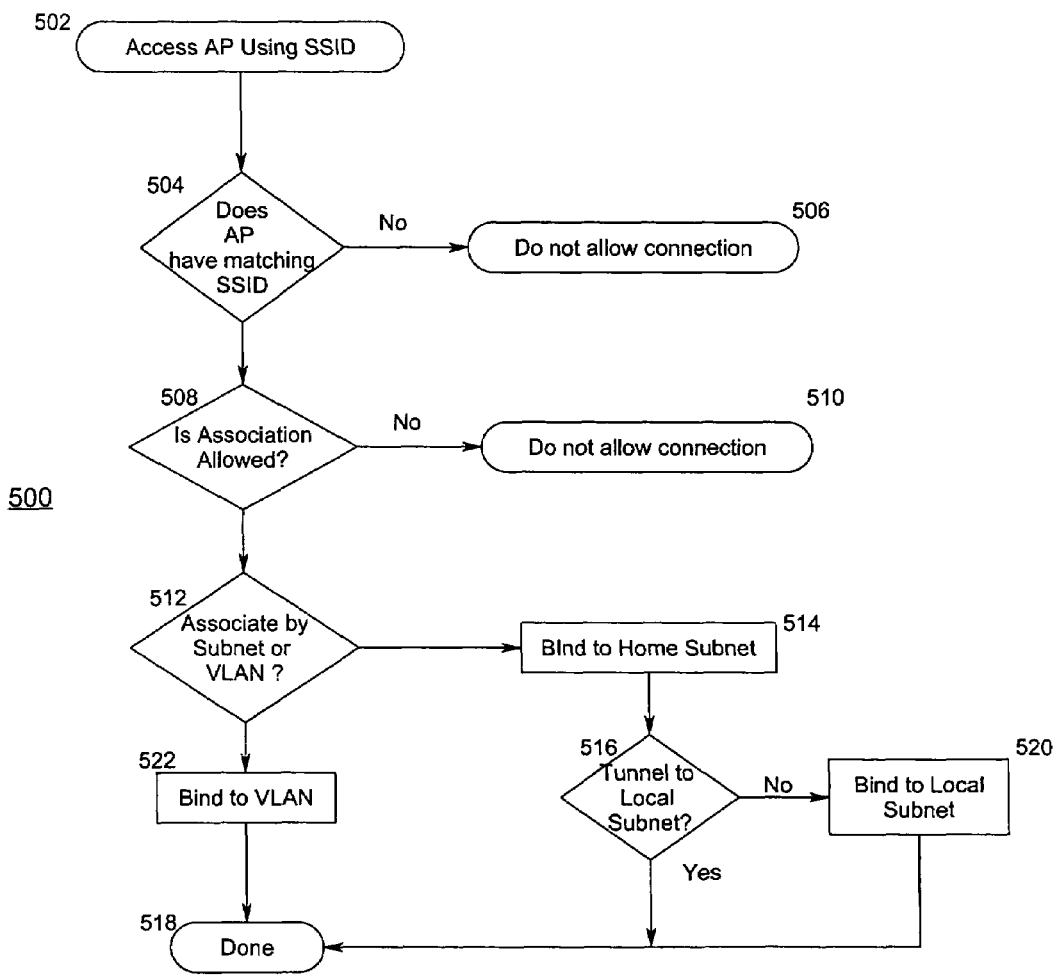
FIG. 5 is a block diagram showing the steps for a wireless station to associate with an access point.

In FIG. 5 there is shown a procedure 500 contemplated by the present invention for a WSTA 208 to associate with an AP 102. Beginning at step 502, the WSTA 208 accesses the AP 102 by sending a message to the AP 102, the message including a SSID (SSID). As shown in step 504, the AP 102 checks to ascertain if it has a matching SSID. If the AP 102 does not have a matching SSID, then as shown in step 506 the AP 102 does not allow the connection.

If the AP 102 does have a matching SSID, then the AP determines at step 508 if the association is allowed for the WSTA 208. This can be done by accessing a security server, such as a RADIUS server. For example, when the RADIUS server is accessed, the RADIUS server returns a list of allowed SSIDs. The association for the WSTA is only allowed if the WSTA's SSID is in the list. This prevents unauthorized access to a service set that is supported in the AP. If the association is not allowed, then at step 510 the AP does not allow the connection.

If the AP 102 does have a matching SSID and the WSTA 208 is allowed to associate, then the AP 102 determines whether to associate the WSTA 208 by Subnet or VLAN. If the association is by subnet, then the AP 102 binds the WSTA 208 to the home subnet 514. At step 516 the AP 102 determines if it can tunnel to the home subnet, if it can than the process is completed as shown in step 518.

If the AP 102 can not tunnel to the home subnet at step 516, then the AP 102 can bind the WSTA 208 to a local subnet as shown in step 520. Then as shown in step 518, the process is completed.

If at step 512 it is determined that the WSTA 208 is to be bound to a VLAN, then the procedure goes to step 522 wherein the WSTA 208 is bound to a VLAN. Then the procedure is completed as shown in step 518.

While in the description of the process of FIG. 5 the process terminates after associating the WSTA 208 to either a subnet or VLAN, as those skilled in the art can readily appreciate, other parameters may be configured at this point in time. As the WSTA 208 associates with another AP 202, the process is repeated. Because each AP 102, 202 has its own separate bindings for the Service Sets, when a WSTA 208 moves from one AP 102, to another AP 202, the VLAN or subnet that the WSTA 208 is bound to may change.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. An access point, comprising: a wireless transceiver; and a lookup table containing service set identifier that the access point is configured to support; wherein the access point is responsive to an association request, the association request comprising an identifier for the wireless station making the request and a service set identifier indicative of a service set that identifies a type of service for the wireless station, received by the wireless transceiver; search the lookup table for the service set identifier received in the association request to determine whether the access point is configured to support the service set; wherein the access point is responsive to accept the association request upon a determination that the access point is configured to support the service set; wherein the access point is responsive to deny the association request upon a determination that the access point is not configured to support the service set; and wherein the type of service is selected from a group consisting of a proxy mobile internet protocol service and a virtual local area network.

2. An access point as set forth in claim 1, further comprising:
the access point is configured to communicate with an authentication server to determine whether the wireless station is authorized for the service set contained in the association request;
wherein the access point is responsive to deny the association request upon a determination that the wireless station is not authorized for the service set.

3. An access point as set forth in claim 2, further comprising:
the access point is suitably adapted to receive from the authentication server a list of authorized service set identifiers for the wireless station; and
the access point is responsive to receiving the list of authorized service set identifiers to search the list of authorized service set identifiers to determine whether the wireless station is authorized for the service set contained in the association request.

4. An access point as set forth in claim 2, further comprising:
the access point is suitably adapted to receive a parameter from the authentication server for the service set contained in the association request from the wireless station.

5. An access point as set forth in claim 2, further comprising:
the access point suitably adapted to determine whether the access point can tunnel to the home subnet for the service set the wireless station is requesting;
wherein the access point tunnels to the home subnet upon a determination that the access point is capable of tunneling to the home subnet; and
wherein the access point binds the wireless station to a local subnet for the service set upon a determination that the access point is incapable of tunneling to the home subnet for the service set.

6. An access point as set forth in claim 5, further comprising the access point configured to use Proxy Mobile IP tunneling to bind the wireless station to the home subnet.

7. An access point as set forth in claim 1, wherein the configuration for the service set is instantiated locally at the access point.

8. A method for an access point to determine whether to allow a wireless station to associate, comprising: receiving an association request, the association request comprising an identifier for the wireless station making the request and a service set identifier indicative of a service set that identifies a type of service for the wireless station determining whether the access point is configured to support the service set; denying the association request upon a determination that the access point is not configured to support the service set; authenticating the association request with an authentication server to determine whether the wireless station is authorized for the service set contained in the association request; and denying the association request upon a determination that the wireless station is not authorized for the service set; wherein the type of service is selected from a group consisting of a proxy mobile internet protocol service and a virtual local area network.

9. A method as set forth in claim 8, further comprising: accepting the association request upon a determination that the access point is configured to support the service set.

10. A method as set forth in claim 8, further comprising: searching a lookup table containing service set identifiers that the access point is configured to support to determine whether the access point is configured to support the service set.

11. A method as set forth in claim 8, further comprising: receiving a list of authorized service set identifiers for the wireless station from the authentication server; and searching the list of authorized service set identifiers to determine whether the wireless station is authorized for the service set contained in the association request.

12. A method as set forth in claim 8, further comprising: determining whether the access point can tunnel to the home subnet for the service set the wireless station is requesting; tunneling to the home subnet upon a determination that the access point is capable of tunneling to the home subnet; and binding the wireless station to a local subnet for the service set upon a determination that the access point is incapable of tunneling to the home subnet for the service set.

13. A method as set forth in claim 8, further comprising binding the wireless station to a local VLAN corresponding to the service set.

14. An access point, comprising: means for receiving from a wireless station an association request, the association request comprising an identifier for the wireless station making the request and a service set identifier indicative of a service set that identifies a type of service for the wireless station; means for determining whether the access point is configured to support the service set; means for accepting the association request responsive to the means for determining whether the access point is configured to support the service set determining that the access point is configured to support the service set; means for denying the association request responsive to the means for determining whether the access point is configured to support the service set determining that the access point is not configured to support the service set; means for communicating with an authentication server to determine whether the wireless station is authorized for the service set contained in the association request; means for receiving from the authentication server a list of authorized service set identifiers for the wireless station; and means for searching the list of authorized service set identifiers to determine whether the wireless station is authorized for the service set contained in the association request; wherein the type of service is selected from a group consisting of a proxy mobile internet protocol service and a virtual local area network.

15. An access point as set forth in claim 14, further comprising: means for denying the association request responsive to a determination that the wireless station is not authorized for the service set.

* * * * *